(12) United States Patent
Nakashima

(10) Patent No.: US 11,494,145 B2
(45) Date of Patent: Nov. 8, 2022

(54) SERVER APPARATUS, CONTROL METHOD, AND STORAGE MEDIUM

(71) Applicant: CANON KABUSHIKI KAISHA, Tokyo (JP)

(72) Inventor: Kazuya Nakashima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/377,630

(22) Filed: Jul. 16, 2021

(65) Prior Publication Data

US 2022/0066716 A1 Mar. 3, 2022

(30) Foreign Application Priority Data

Sep. 3, 2020 (JP) .............................. JP2020-148370

(51) Int. Cl.
*G06F 15/00* (2006.01)
*G06F 3/12* (2006.01)
*G06K 1/00* (2006.01)

(52) U.S. Cl.
CPC .......... *G06F 3/1271* (2013.01); *G06F 3/1204* (2013.01); *G06F 3/1287* (2013.01); *G06F 3/1292* (2013.01)

(58) Field of Classification Search
CPC .... G06F 3/1271; G06F 3/1204; G06F 3/1287; G06F 3/1292
USPC ............................... 358/1.15, 1.14, 1.13, 1.1
See application file for complete search history.

(56) References Cited

U.S. PATENT DOCUMENTS

| 8,675,234 | B2 | 3/2014 | Sato | |
| 8,786,875 | B1* | 7/2014 | Khafizova | H04L 67/06 |
| | | | | 358/1.15 |
| 8,885,189 | B2 | 11/2014 | Armstrong | |
| 9,524,133 | B2* | 12/2016 | Takano | G06F 3/1205 |
| 2022/0066707 | A1* | 3/2022 | Shiohara | G06F 3/1204 |

FOREIGN PATENT DOCUMENTS

JP 2012133489 A 7/2012

OTHER PUBLICATIONS

Extended European Search Report issued in European Application No. 21184826.2 dated Jan. 7, 2022.

* cited by examiner

*Primary Examiner* — Douglas Q Tran
(74) *Attorney, Agent, or Firm* — Rossi, Kimms & McDowell LLP

(57) ABSTRACT

A server apparatus providing a cloud print service that receives a print job and causes an image forming apparatus to perform print processing for the received print job, the server apparatus including: a first reception unit configured to receive a print job from a client terminal or another server apparatus that provides another cloud print service; a second reception unit configured to receive instructions to change setting of the print job received by the first reception unit, the instructions being given via the image forming apparatus; and a notification unit configured to notify the other server apparatus of contents of the instructions in a case where the instructions received by the second reception unit are instructions for the print job received by the first reception unit from the other server apparatus.

18 Claims, 16 Drawing Sheets

2020/1 OUTPUT REPORT

| JOB NAME | TOTAL NUMBER OF PAGES | COLOR | MONOCHROME | SINGLE-SIDED | DOUBLE-SIDED |
|---|---|---|---|---|---|
| a.pdf | 10 | 10 | 0 | 0 | 10 |
| a.pdf | 5 | 0 | 5 | 5 | 0 |
| ... | ... | ... | ... | ... | ... |
| TOTAL NUMBER | 120 | 50 | 70 | 80 | 40 |

FIG.3

```
801   job-id = 1
802   job-name = "1.pdf"
803   requesting-user-name = "user1"
      color-mode = "color"
804   duplex-mode = "simplex"
```

FIG.8

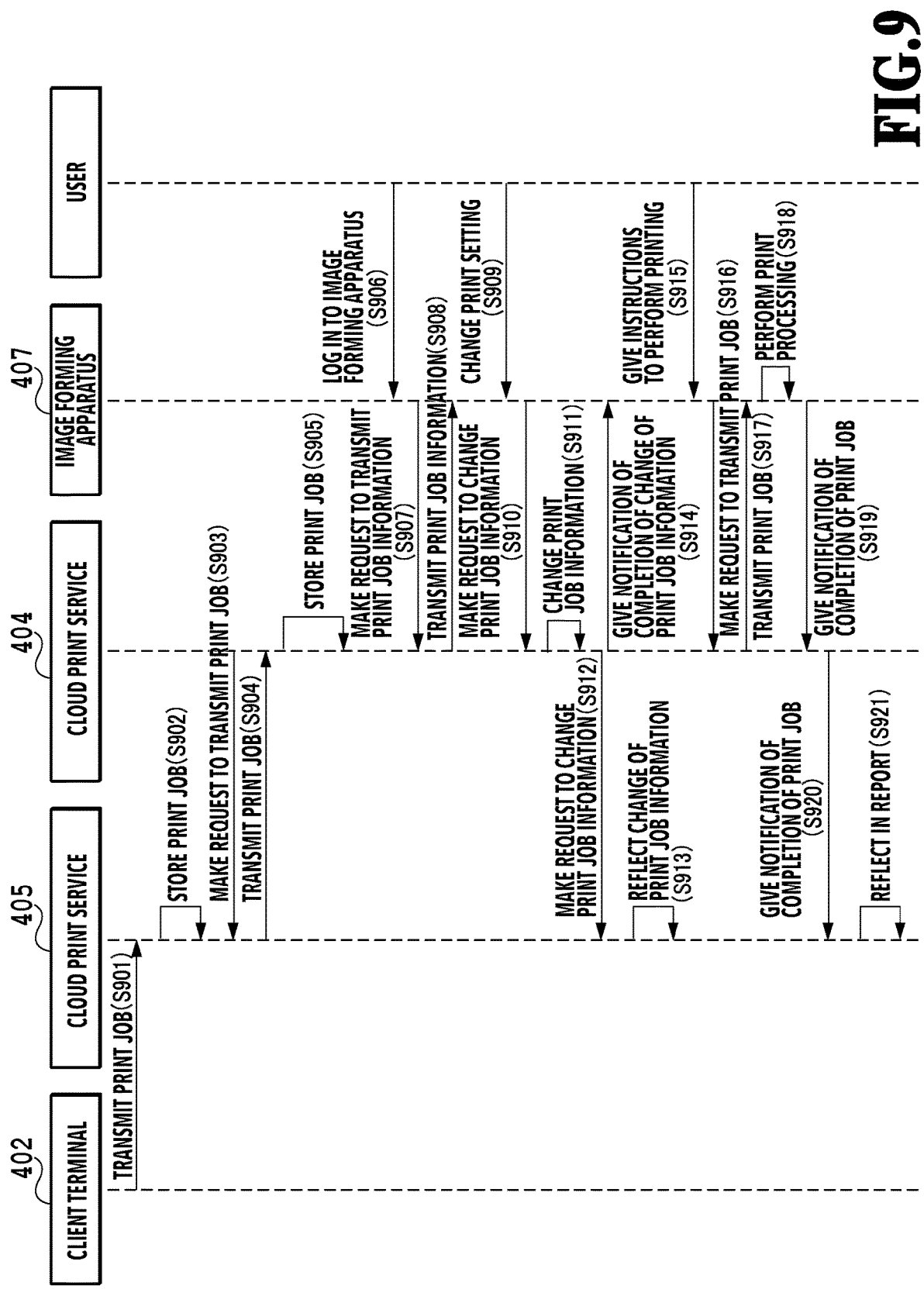

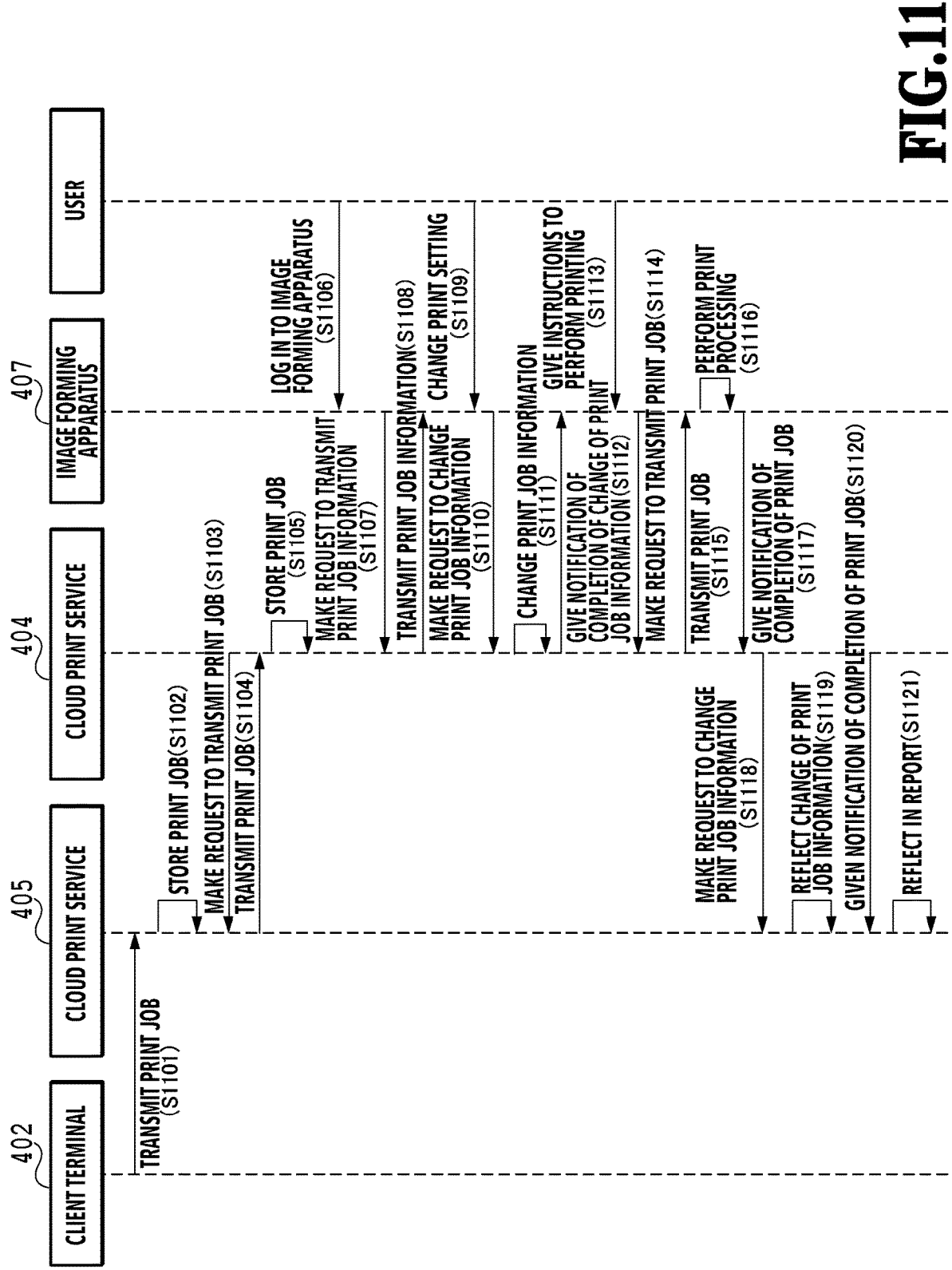

| PRINTER NAME | TOTAL NUMBER OF PAGES | COLOR | MONOCHROME | SINGLE-SIDED | DOUBLE-SIDED |
|---|---|---|---|---|---|
| PRINTER A | 100 | 30 | 70 | 100 | 0 |
| PRINTER B | 120 | 0 | 120 | 60 | 60 |
| CPS404 | 100 | 50 | 50 | 100 | 0 |
| ... | ... | ... | ... | ... | ... |

FIG.13

```
job-id=1  ~1501
Device-serialNo = dev0000001 ~1502
Ip-address = xxx.xx.xx.xx1 ~1503
```

FIG.15

1601 {
Device-id=1
Device-name=Printer A
Device-serialNo=dev0000001
Ip-address=xxx.xx.xx.xx1

1602 {
Device-id=2
Device-name=Printer B
Device-serialNo=dev0000002
Ip-address=xxx.xx.xx.xx2

SERVER APPARATUS, CONTROL METHOD, AND STORAGE MEDIUM

BACKGROUND OF THE DISCLOSURE

Field of the Disclosure

The technique of the present disclosure relates to a server apparatus, a control method, and a storage medium.

Description of the Related Art

There is a cloud print service that performs transmission and reception of a print job between a terminal and an image forming apparatus via a cloud computing system. As the cloud print service, a plurality of cloud print services exists, such as GoogleCloudPrint (registered trademark), MicrosoftHybridCloudPrint (registered trademark), and UniflowOnLine (registered trademark).

As part of functions provided by the cloud print service, there is a function to generate a report for a user to manage the number of output sheets and the like. By the report generated by the cloud print service, it is possible for a user to check the total number of printed sheets for each month, the number of printed sheets for each user or for each printer, and the like.

Japanese Patent Laid-Open No. 2012-133489 has described a printing system including a client terminal, a print service apparatus, and an image forming apparatus, which are connected via a network, as a system for providing the cloud print service.

In the printing system using the cloud print service (also described as CPS), it is considered that the printing system is constructed by causing a plurality of CPS's to cooperate with one another. The printing system in FIG. 4 is an example of a printing system that causes a plurality of CPS's to cooperate with one another. As shown in FIG. 4, a configuration of the printing system is considered in which in a case where a user inputs a print job from a client terminal by taking a CPS 405 or a CPS 406 as a destination, the print job is transferred to an image forming apparatus via a CPS 404. By this configuration, it is possible to aggregate the CPS that transmits a print job to the image forming apparatus even in a case where a plurality of client terminals is connected to different CPS's.

In a case where a print job that is input to the CPS 405 or the CPS 406 from the client terminal is transmitted to the image forming apparatus via the CPS 404, it may happen sometimes that instructions to change print setting included in the print job are given via the image forming apparatus. In this case, it is not possible for the CPS 405 or the CPS 406 to which the print job is input to check that the print setting included in the print job has been changed. Because of this, there is a possibility that the contents of a report generated by the CPS 405 or the CPS 406 are different from the contents of the print setting at the time of the actual output by the image forming apparatus.

SUMMARY OF THE DISCLOSURE

An object of the technique of the present disclosure is to appropriately reflect a change in setting that is made by an image information apparatus in a report of a CPS to which a print job is input even in a case where the image forming apparatus is caused to perform print processing for the print job transmitted from the CPS to which the print job is input via another CPS.

The server apparatus of the present disclosure is a server apparatus providing a cloud print service that receives a print job and causes an image forming apparatus to perform print processing for the received print job, the server apparatus comprising: a first reception unit configured to receive a print job from a client terminal or another server apparatus that provides another cloud print service; a second reception unit configured to receive instructions to change setting of the print job received by the first reception unit, the instructions being given via the image forming apparatus; and a notification unit configured to notify the other server apparatus of contents of the instructions in a case where the instructions received by the second reception unit are instructions for the print job received by the first reception unit from the other server apparatus.

Further features of the present disclosure will become apparent from the following description of exemplary embodiments with reference to the attached drawings.

BRIEF DESCRIPTION OF THE DRAWINGS

FIG. 3 is a diagram showing a report that is generated in a cloud print service;

FIG. 8 is a diagram showing an example of print job information;

FIG. 9 is a diagram for explaining print processing using a plurality of cloud print services;

FIG. 11 is a diagram for explaining print processing using a plurality of cloud print services;

FIG. 13 is a diagram showing a comparison example of a report that is generated in a cloud print service;

FIG. 15 is a diagram showing an example of output printer information; and

FIG. 16 is a diagram showing an example of a printer information list.

DESCRIPTION OF THE EMBODIMENTS

In the following, an aspect for performing the technique of the present disclosure is explained by using the drawings.

First Embodiment

[About Cloud Print Service]

Before explanation of the present embodiment, a cloud print service is explained. The cloud print service is a print service that performs transmission and reception of a print job between a terminal and an image forming apparatus via a cloud computing system. In the following, explanation is given on the assumption that the cloud print service (CPS) refers to a server apparatus that provides the cloud print service.

Figure 1:
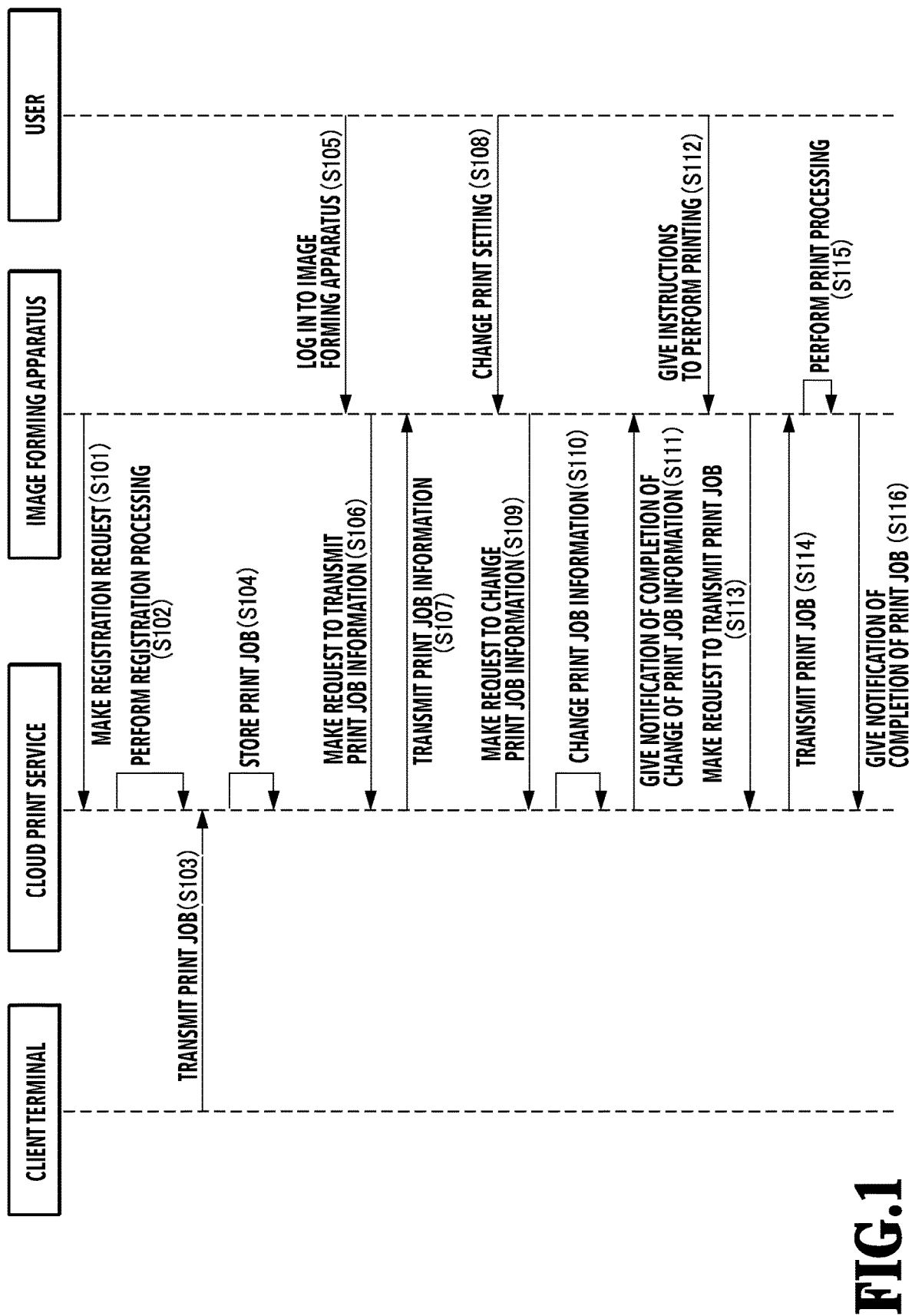
FIG. 1 is a diagram for explaining print processing using a cloud print service.

FIG. 1 is a sequence diagram for explaining print processing by a printing system including a client terminal, a CPS, and an image forming apparatus, which are connected via a network. An outline of print processing by the printing system using the CPS is explained by using FIG. 1. Symbol "S" in explanation of each piece of processing means a step in the flow. For convenience of explanation, the operation of a user is explained also by attaching "S" thereto.

First, an administrator registers an image forming apparatus to a tenant of a cloud print service to which the administrator belongs. The administrator sets which user is permitted to use the image forming apparatus among users belonging to the tenant. The tenant means one service system a user develops on the cloud (S101 to S102).

A user who is permitted to use the image forming apparatus inputs a print job to a CPS from a client terminal (S103). The CPS causes a storage of the CPS to store the received print job (S104). After this, the user logs in to the image forming apparatus and the image forming apparatus receives print job information on the print job stored in the CPS (S105 to S107). The user checks print setting included in the print job information and gives instructions to change the print setting to the image forming apparatus in a case of changing the print setting (S108). The CPS having received a request to change the print setting included in the print job information from the image forming apparatus changes the print setting of the stored print job (S109 to S111). Then, by the user instructing the image forming apparatus to perform printing (S112), the image forming apparatus acquires the print job whose print setting has been changed from the CPS and performs print processing (S113 to S115). The method by which the image forming apparatus acquires the print job from the CPS may be a pull method or a push method. In a case where the image forming apparatus completes the print processing, the image forming apparatus transmits a notification of completion of the print job to the CPS (S116).

Figure 2:
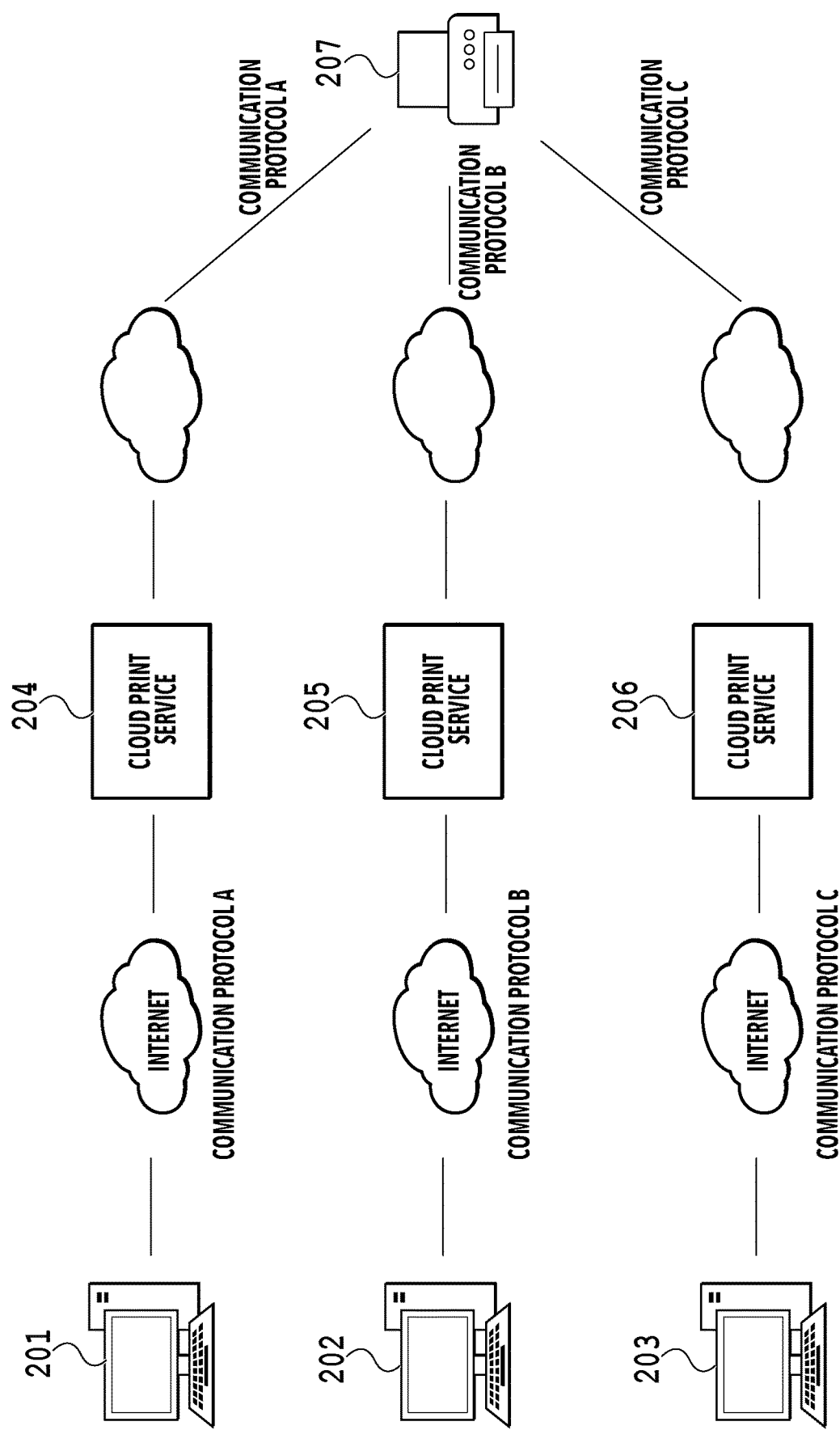
FIG. 2. is a diagram showing a printing system having a plurality of cloud print services.

FIG. 2 is a configuration diagram showing an example of a printing system for implementing a print environment by a cloud computing system by causing a plurality of CPS's to cooperate with one another. In the printing system in FIG. 2, in a case where a user is in contract with one of CPS's 204 to 206, it is possible to print a print job by transmitting the print job to an image forming apparatus 407 within the printing system from terminals 201 to 203. There is also a cloud service that provides the print service by the CPS as part of the functions of a compound cloud service having the cloud storage service, the document editing service and the like.

FIG. 3 is a diagram for explaining a report that is provided by the CPS. As part of the functions the CPS provides to a user, there is a report function to generate a report for managing the number of output sheets and the like and provide the report to a user. The report function is a function to provide totalization results of print history, and the like to a user by storing the number of printed sheets and the like in color printing or monochrome printing at the time of print processing in a case where a notification of completion of a print job is received from the image forming apparatus. By the report function, it is possible to check the total number of printed sheets for each month, the number of printed sheets and the like for each user or for each printer, and therefore, it is possible for a printer administrator to easily perform processing, such as payment management relating to printing from the total number of printed sheets for each month. Further, by the report function, it is possible for a user to check the current number of printed sheets, and therefore, it is possible for a user to perform management so that an upper limit of the number of printed sheets is not exceeded in a case where the upper limit is set to the number of printed sheets for each user.

[Configuration of Printing System of the Present Embodiment]

Figure 4:
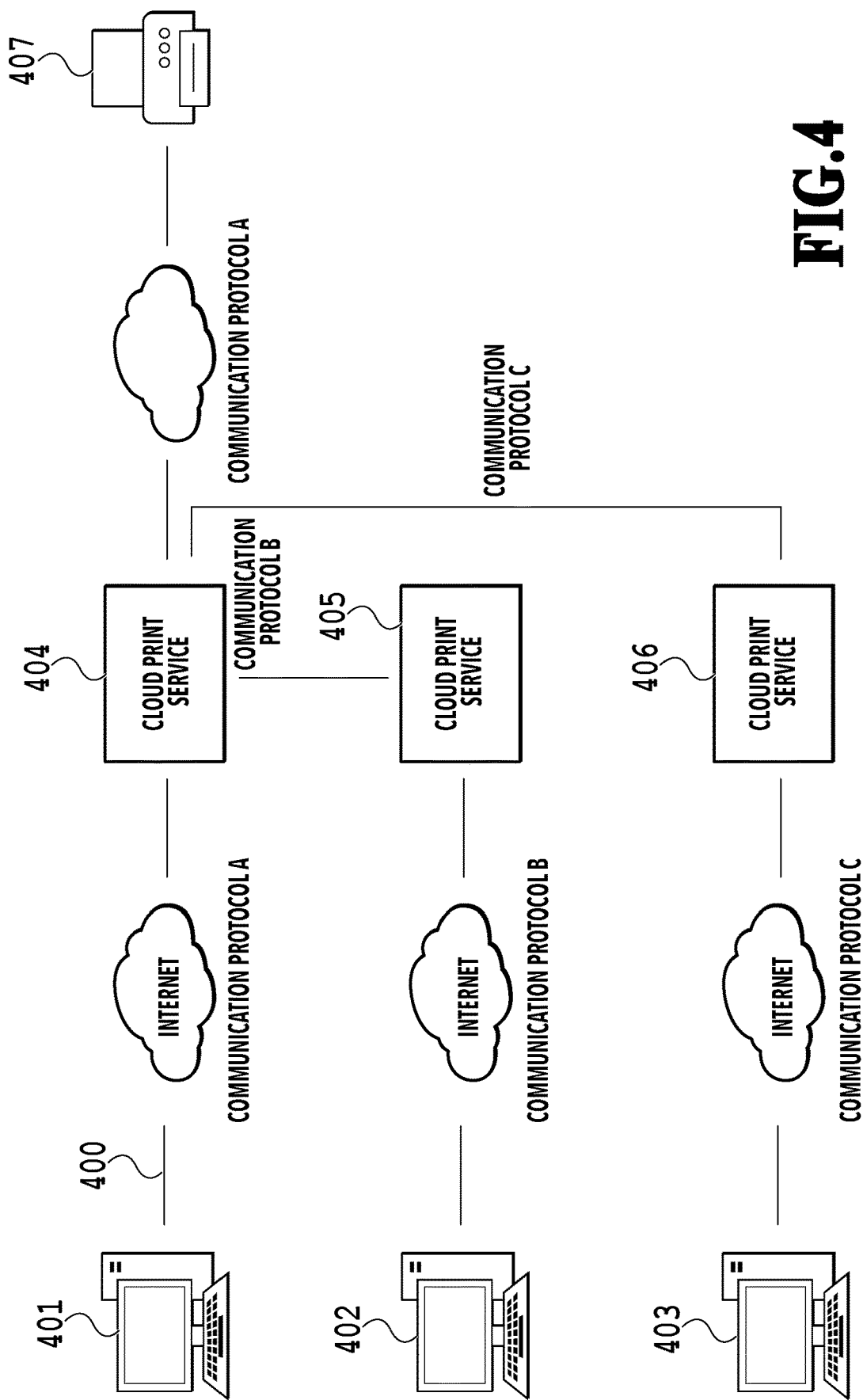
FIG. 4 is a diagram showing a printing system having a plurality of cloud print services.

FIG. 4 is a block diagram showing the configuration of the printing system of the present embodiment. The printing system of the present embodiment has client terminals 401 to 403, the CPS's 404 to 406, and the image forming apparatus 407.

The client terminals 401 to 403 are each a client terminal from which a print job is input (transmitted) to each of the CPS's 404 to 406, respectively.

The CPS 404 is a CPS that receives a print job from the client terminal 401 and also receives a print job from the other CPS's 405, 406 within the printing system. Then, the CPS 404 is a CPS that causes the image forming apparatus 407 to perform print processing for the received print job. The CPS 405 and the CPS 406 are sometimes described as the external CPS 405 and the external CPS 406 in this specification.

The external CPS's 405, 406 are each a CPS that receives a print job from the client terminals 402, 403, transfers the received print job to the CPS 404 and causes the image forming apparatus 407 to perform print processing via the CPS 404. The external CPS's 405, 406 may be connected with an image forming apparatus, not shown schematically, other than the image forming apparatus 407 and in that case, they may also be CPS's capable of causing an image forming apparatus, not shown schematically, to perform print processing without intervention of the CPS 404.

Explanation is given on the assumption that the CPS 404 takes "CompanyA.canon.com" as the tenant name, the CPS 405 takes "CompanyA.onmicrosoft.com" as the tenant name, and the CPS 406 takes "CompanyA.gmail.com" as the tenant name.

The image forming apparatus 407 is connected with the CPS 404 so as to be capable of communication and receives a print job from the CPS 404 and performs print processing based on the received print job. The image forming apparatus 407 is implemented by, for example, a printer.

As above, the printing system of the present embodiment is a printing system for implementing a print environment by a cloud that causes the plurality of the CPS's 404 to 406 to cooperate with one another. The configuration is designed so that the CPS that connects to the image forming apparatus 407 and transmits a print job to the image forming apparatus is only the CPS 404. Because of this, the configuration is such that in a case where a print job is input to the external CPS 405 from the client terminal 402 connected with the external CPS 405, the print job is transferred via the CPS 404 up to the image forming apparatus 407 that actually performs printing. It is possible to implement the configuration of the printing system such as this by registering the CPS 404 as a virtual printer to the tenant of the external CPS 405. By this configuration, the print jobs received by the plurality of the CPS's 404 to 406 are aggregated by the one CPS 404. Because of this, for example, according to the printing system in FIG. 4, it is possible to manage the number of output sheets of the image forming apparatus by one CPS that aggregates print jobs.

Each component of the printing system is connected by a network 400 so as to be capable of communication. The network is, for example, one of LAN, such as the internet, WAN, telephone line, dedicated digital line, ATM and the like. Alternatively, the network may be a communication network that is implemented by a combination of these. That is, the network 400 is only required to be capable of performing transmission and reception of data.

[Comparison Example of Print Processing by Printing System having a Plurality of CPS's]

Figure 5:
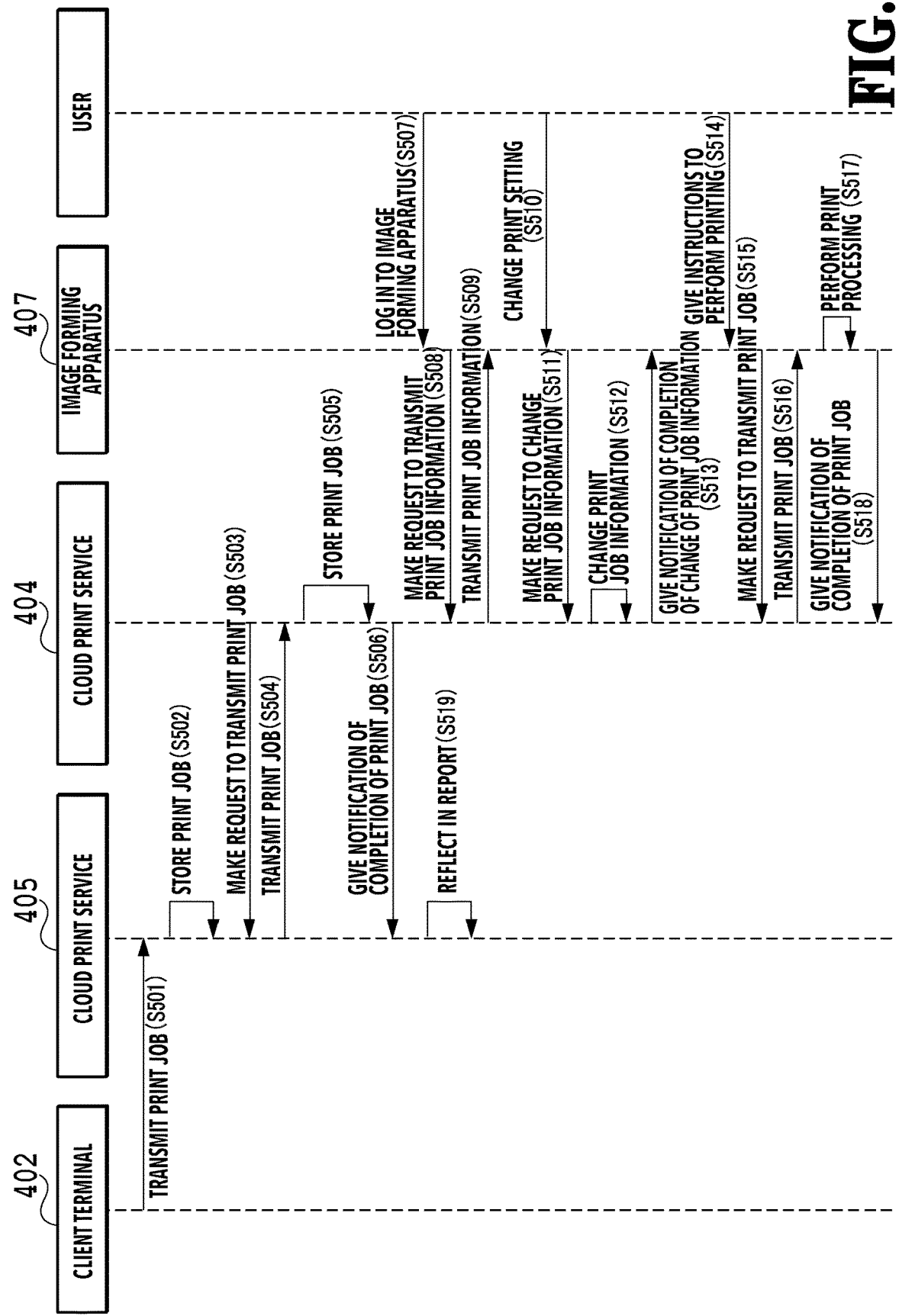
FIG. 5 is a diagram for explaining print processing of a comparison example using a plurality of cloud print services.

FIG. 5 is a sequence diagram showing a comparison example of print processing by the printing system in FIG. 4 in a case where the sequence diagram in FIG. 1 is applied to the printing system in FIG. 4 having a plurality of CPS's. In FIG. 5, different from FIG. 1, registration processing is omitted. FIG. 5 is a sequence diagram showing print processing of a print job received by the external CPS 405.

In a case where a print job is input to the external CPS 405 (S501 to S502), the CPS 404 receives the print job from the external CPS 405 and stores the received print job (S503 to S505).

In response to the storage of the print job, the CPS 404 gives a notification of completion of the print job to the external CPS 405 to which the print job is input from the client terminal (S506). Upon receipt of the notification of completion of the print job, the external CPS 405 reflects the print results of the print job in a report (S519). The processing at S507 to S518 is the same as the processing at S105 to S116.

In the print processing in the comparison example, as shown at S506, the CPS 404 notifies the external CPS 405 of the completion of the print job by regarding the print processing of the print job as having been completed at the point in time of the storage of the print job by the CPS 404. After that, even in a case where the print setting of the print job is changed via the image forming apparatus 407, in the comparison example, it is not possible for the external CPS 405 to check that the print setting included in the print job information on the print job has been changed. Because of this, for example, in a case where a user changes the print setting of the print job for color printing to the print setting for monochrome printing through the image forming apparatus and performs printing, in the report generation by the external CPS 405, a report is generated by regarding that color printing has been performed for the print job.

There is a case where, as part of the compound cloud service including a cloud service other than the print service, the print service by the CPS is provided. For example, there is a case where the print service by the external CPS 405 is provided as part of the compound cloud service. In this case, it is considered that a user who makes use of the compound cloud service makes use of the report function by the external CPS 405 in place of the report function by the CPS 404. To the user, a report indicating erroneous printing totalization results and the like is provided by the external CPS 405. Because of this, for example, there is a possibility that the user recognizes the number of printed sheets erroneously by the report provided by the external CPS 405.

Consequently, in the present embodiment, the CPS 404 receives a print job from the external CPS and transmits the received print job to the image forming apparatus and the CPS 404 makes a request to change print job information to the external CPS to which the print job is input from the client terminal. It is possible for the external CPS to change the stored print job information based on the change contents of the print job information included in the request to change print job information.

[Hardware Configuration]

Figure 6:
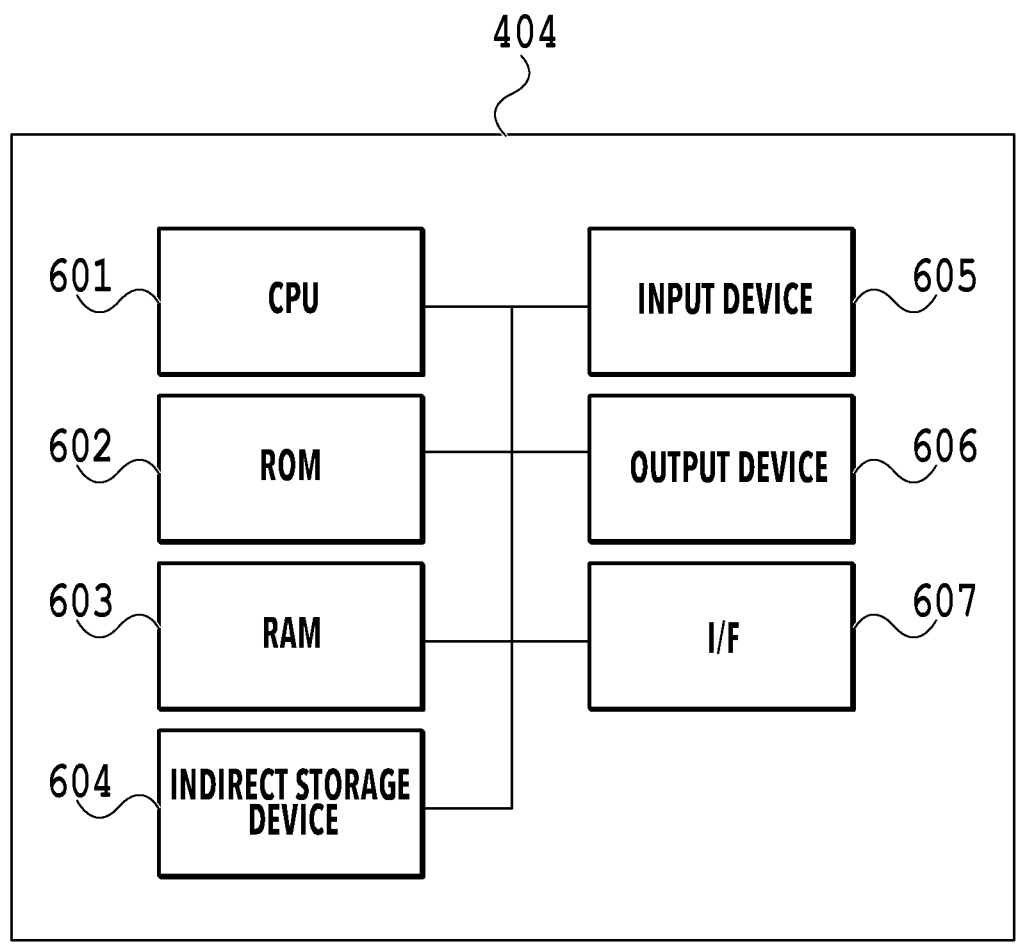
FIG. 6 is a block diagram showing a hardware configuration of a cloud print service.

FIG. 6 is a block diagram showing the hardware configuration of the CPS 404. The hardware configuration of the external CPS's 405, 406 is also the same as the configuration of the CPS 404 to be explained below.

A CPU 601 directly or indirectly controls each device (ROM, RAM and the like) connected by an internal device and executes programs for implementing the functions of the CPS 404. A ROM 602 stores a BIOS and the like. A RAM (direct storage device) 603 is used as a work area of the CPU 601 and also used as a temporary storage area for loading software modules for implementing the functions of the CPS 404 of the present embodiment. An indirect storage device 604 stores an OS that is the basic software and software modules and is realized by, for example, an HDD (Hard Disk Driver), an SSD (Solid State Drive) and the like. An output device 606 is realized by, for example, a liquid crystal display, an LED and the like and displays various kinds of information. An input device 605 is realized by, for example, a keyboard, a pointing device and the like and receives various operations by a user. An I/F 607 is an interface for connecting to the network 400.

[Function Configuration]

Figure 7:
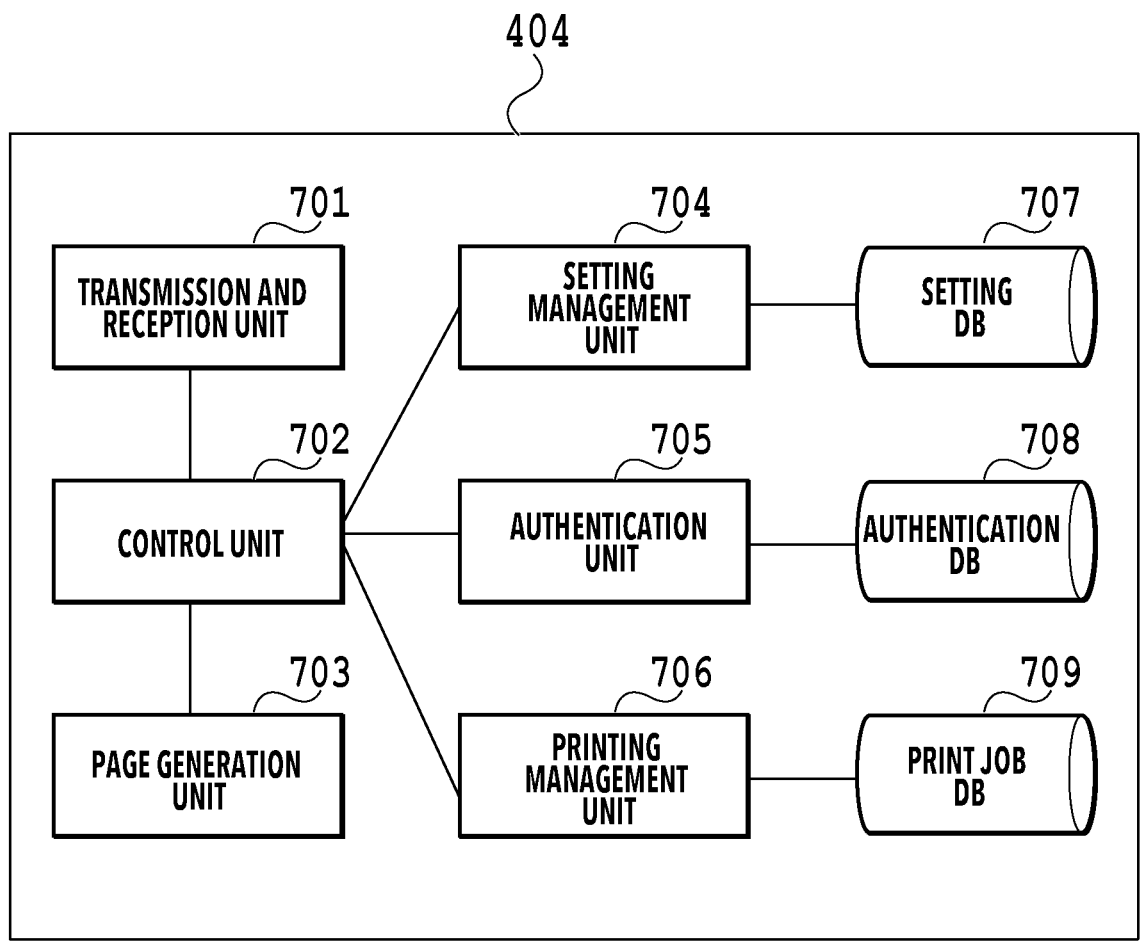
FIG. 7 is a block diagram showing a function configuration of a cloud print service.

FIG. 7 is a block diagram showing the function configuration of the CPS 404. The function configuration of the external CPS's 405, 406 is also the same as the function configuration of the CPS 404, to be explained below. The CPS 404 has a transmission and reception unit 701, a control unit 702, a page generation unit 703, a setting management unit 704, an authentication unit 705, and a printing management unit 706.

The transmission and reception unit 701 performs transmission and reception of data by processing communication with a Web browser of the client terminal 44 or the external CPS's 405, 406 that cooperate with each other. The control unit 702 performs processing in accordance with a request received by the transmission and reception unit 701. The page generation unit 703 generates a Web page for returning a response to the Web browser of the client terminal 401.

The setting management unit 704 controls information by storing various kinds of setting information relating to the CPS 404, information on the external CPS's 405, 406 that cooperate with each other, and information on the image forming apparatus 407 registered in the CPS 404 in a setting DB 707.

The authentication unit 705 authenticates a user having requested to log in to the CPS 404 by using an authentication DB 708 in which user account information on the CPS's 404 to 406 is stored and controls a user authentication request to the external CPS's 405, 406.

The printing management unit 706 performs control to store the print job received from the client terminal 401 or the print job received from the external CPS's 405, 406 that cooperate with each other in a print job DB 709. Further, the printing management unit 706 performs image processing, such as rendering, for the print job.

The function of each unit in FIG. 7 is implemented by the CPU 601 of the CPS 404 loading the program code stored in the ROM 602 or the indirect storage device 604 onto the RAM and executing the program code. Alternatively, part or all of the functions of each unit described above may be implemented by hardware, such as an ASIC and an electronic circuit. [About print processing by printing system of the present embodiment]

FIG. 8 is a diagram showing print job information included in a print job. The print job information in FIG. 8 is an example of the print job information included in a print job that is input to the external CPS 405 from the client terminal. In the print job information, there is an area 801 storing a job ID indicating a unique identifier for identifying the print job received by the external CPS 405. Further, in the print job information, an area 802 storing a job name that is information for a user to identify the print job in the image forming apparatus 407 and an area 803 storing the name of a user who performs printing are included. Furthermore, in the print job information, an area 804 storing information on print setting including information indicating whether color printing or monochrome printing is performed at the time of printing, information indicating whether single-sided printing or double-sided printing is performed at the time of printing, and the like is included.

FIG. 9 is a sequence diagram showing print processing of the present embodiment in the printing system in FIG. 4. The processing in each apparatus shown in the sequence diagram in FIG. 9 is performed by the CPU of each apparatus loading the program code stored in the ROM onto the RAM and executing the program code. Further, part or all of the functions at the steps in FIG. 9 may be implemented by hardware, such as an ASIC and an electronic circuit, of each apparatus. Symbol "S" in explanation of each piece of processing means a step in the flow. For convenience of explanation, explanation is given by attaching "S" also to the operation of a user. FIG. 9 is a sequence diagram showing print processing of a print job received by the external CPS 405 as in FIG. 5.

At S901, a print job is input to the external CPS 405 from the client terminal 402. At S902, the CPS 405 stores the print job input from the client terminal 402.

Next S903 to S905 are steps for the CPS 404 to receive a print job from the external CPS 405. At S903, the CPS 404 requests the external CPS 405 to transmit a print job. Upon receipt of the request to transmit a print job, the external CPS 405 transmits the print job stored at S902 to the CPS 404 at S904. At S905, the CPS 404 stores the received print job. In the present embodiment, different from the comparison example in FIG. 5, the CPS 404 does not notify the external CPS 405 of completion of the print job in response to the storage of the received print job.

S906 to S908 are steps for the image forming apparatus 407 to acquire print job information on the print job stored in the CPS 404. At S906, a user logs in to the image forming apparatus 407. At S907, the image forming apparatus 407 having received the login of the user requests the CPS 404 to transmit print job information on the print job stored in the CPS 404. Upon receipt of the request to transmit print job information, the CPS 404 transmits the print job information to the image forming apparatus 407 at S908.

The user checks the print setting included in the print job information received by the image forming apparatus 407 and in a case of changing the print setting, gives instructions to change the print setting to the image forming apparatus 407. In this sequence diagram, explanation is given on the assumption that the user gives instructions to change the print setting. In a case where the user gives instructions to change the print setting via the image forming apparatus 407 at S909, the image forming apparatus 407 having received the instructions to change the print setting transmits a request (instructions) to change the print job information to the CPS 404 at S910.

Upon receipt of the request to change the print job information, the CPS 404 performs processing to change the print job information on the stored print job in accordance with the change request from the image forming apparatus 407 at S911.

Figure 10A:
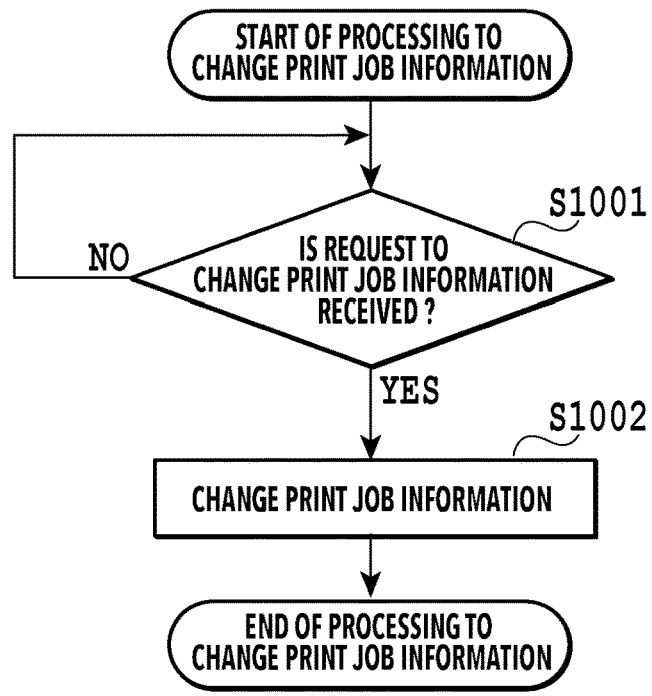
FIGS. 10A and 10B are flowcharts for explaining processing in a cloud print service.
Figure 10B:
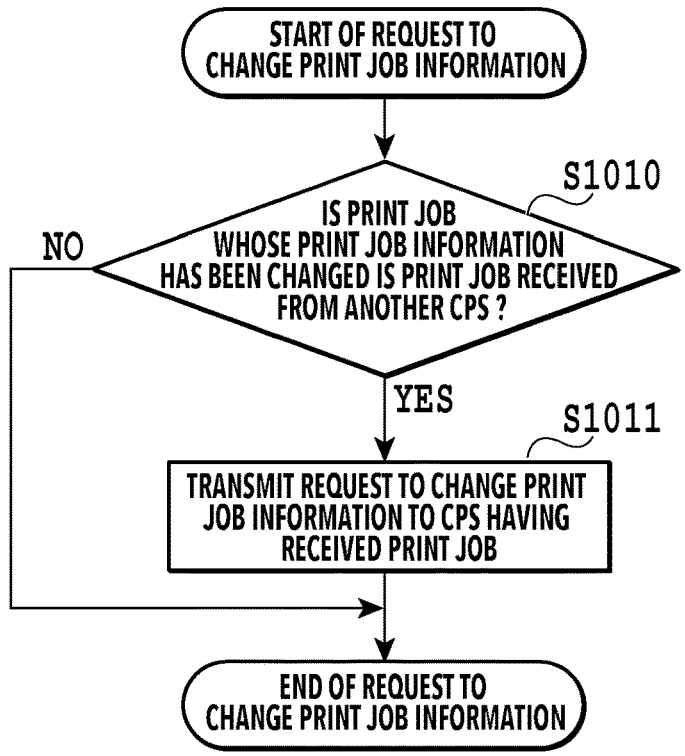

FIG. 10A is a flowchart for explaining details of the processing by the CPS 404, which is performed before the processing to change the print job information at S911 is performed. Explanation is given on the assumption that the processing shown in the flowchart in FIGS. 10A and 10B is performed by the CPU 601 of the CPS 404 loading the program code stored in the ROM 602 onto the RAM 603 and executing the program code. Further, part or all of the functions at the steps in FIG. 10A or 10B may be implemented by hardware, such as an ASIC and an electronic circuit.

The CPU 601 monitors whether a request to change print job information is transmitted from the image forming apparatus 407 and at S1001, the CPU 601 determines whether a request to change print job information is received from the image forming apparatus 407. In a case where a request to change print job information is received from the image forming apparatus 407, the processing advances to S1002 and the CPU 601 performs the processing at S911. That is, the CPU 601 changes the print job information on the stored print job in accordance with the change contents included in the change request received from the image forming apparatus 407.

FIG. 10B is a flowchart for explaining the processing by the CPS 404, which is performed after the processing to change print job information at S911. In a case where the change of the print job information on the print job stored in the CPS 404 is completed, at S1010, the CPU 601 determines whether the print job including the print job information changed at S911 is the print job received from the external CPS.

In a case where the print job is the print job received from the external CPS (YES at S1010), the processing advances to S1011. At S1011, the CPU 601 transmits a request to change the print job information to the external CPS (external CPS to which the print job is input from the client terminal) having transmitted the print job. The processing at this step is the processing at S912 in the sequence diagram in FIG. 9. In the contents of the change request that the CPS 404 transmits to the external CPS 405 at S912 (S1011), at least the information for identifying the print job having the print setting to be changed and the information indicating the contents of the print setting to be changed are included. For example, the print job information after the print setting is changed is transmitted.

In a case where the print job is not the print job received from the external CPS (NO at S1010), the processing in this flowchart is terminated without performing the processing at S1011. In this case, the processing at S912, S913 in the sequence diagram is not performed.

Next, in the external CPS 405, the same processing as that in FIG. 10A is performed. That is, the CPU (not shown schematically) of the external CPS 405 monitors whether a request to change print job information is transmitted from the CPS 404. Then, in a case where a request to change print job information is received from the CPS 404, the CPU of the external CPS 405 performs the processing at S913. That is, at S913, the external CPS 405 having received the change request changes the print job information on the print job stored in the external CPS 405. Specifically, the external CPS 405 specifies the change-target print job from the job ID included in the print job information included in the change request received from the CPS 404 and changes the print setting included in the print job information on the specified print job.

On the other hand, at S914, the CPS 404 notifies the image forming apparatus 407 of completion of the change of the print job information.

S915 to S918 are processing in which the image forming apparatus 407 performs print processing of a print job. In a case where a user instructs the image forming apparatus 407 to perform printing at S915, the image forming apparatus 407 requests the CPS 404 to transmit the print job for which the image forming apparatus 407 is instructed to perform printing by a user at S916. In a case of receiving the request to transmit the print job, the CPS 404 transmits the print job that is requested to be transmitted to the image forming apparatus 407 at S917. In a case where instructions to change the print setting are given by a user, at this step, the print job in which the change of the print setting is reflected is transmitted. At S918, the image forming apparatus 407 performs the print processing of the received print job.

In a case where the print processing is completed, at S919, the image forming apparatus 407 notifies the CPS 404 of completion of the print job. At S920, the CPS 404 notifies the external CPS 405 of completion of the print job in response to receiving the notification of completion of the print job from the image forming apparatus 407.

At S921, the external CPS 405 performs processing to reflect the print results of the print job for which the print processing is completed in a report based on the print job information on the stored print job.

As explained above, in the present embodiment, even in a case where the print setting is changed by the image forming apparatus 407, the change contents of the print setting are reflected in the print job information on the print job stored in the external CPS 405. Because of this, it is possible to appropriately reflect the results of the print job for which the print processing is completed in a report.

In the above-described explanation, explanation is given to the method of correctly reflecting information at the time of actual printing in a report that is provided from the CPS by updating the print job information before the print processing is completed. In addition, for example, it may also be possible for the CPS to have a function to reflect information also including the history of the change of the print job information, which is performed before the print processing is completed, in a report. In this case, the configuration may be one in which the CPS changes the information that is displayed in a report in place of the print job information on a condition that the change request is received. For example, at S913 in FIG. 9, it may also be possible to generate a report each time in which change contents are reflected and by which the change history is known in a case where the request to change print job information is received in place of changing the print job information. Further, at that time, it is preferable to establish consistency with the print job information.

According to the technique of the present disclosure, even in a case where the image forming apparatus is caused to perform the print processing of the print job by the CPS to which the print job is input via another CPS, it is possible to appropriately reflect the change of setting performed by the image forming apparatus in a report of the CPS to which the print job is input.

Second Embodiment

In the first embodiment, the print job information on the external CPS 405 can be changed by receiving the print setting change information from the CPS 404. However, the report results are also used for payment management in printing by receiving the number of output sheets in color printing and that in monochrome printing, and therefore, sometimes, the state where it is possible to change the print job information without restrictions is not preferable in terms of management. Consequently, in the present embodiment, explanation is given to a method of not receiving an inappropriate change of print job information by imposing restrictions on the change of print job information. In the present embodiment, differences form the first embodiment are explained mainly. The portions not described explicitly in particular are the same configuration and processing as those of the first embodiment.

FIG. 11 is a sequence diagram showing print processing of the present embodiment in the printing system in FIG. 4. By using FIG. 11, the print processing in the present embodiment is explained.

S1101 to S1111 are the same as S901 to S911, and therefore, explanation is omitted. The CPS 404 of the present embodiment is different from that in the first embodiment and does not request the external CPS 405 to change print job information after changing the print job information on the print job stored at S111 upon receipt of a request to change print job information from the image forming apparatus 407. As will be described later, the CPS 404 requests the external CPS 405 to which the print job is input from the client terminal to change print job information after receiving the notification of completion of the print job from the image forming apparatus 407.

The processing at S1112 to S1117 is the same as the processing at S914 to S919, and therefore, explanation is omitted. In a case where the CPS 404 receives a notification of completion of the print job by the image forming apparatus 407 at S1117, the CPS 404 requests the external CPS 405 to change print job information at S1118. Even in case where the CPS 404 is requested to change print job information a plurality of times by the image forming apparatus 407, the CPS 404 requests the CPS 405 to change print job information only a predetermined number of times. In the present embodiment, explanation is given on the assumption that the predetermined number of times is one. In a case where the CPS 404 requests the external CPS 405 to change print job information, the CPS 404 notifies the external CPS 405 of the state of the last print job information.

At S1119, the external CPS 405 performs processing to change the print job information on the print job requested to be changed in response to the change request. In a case of receiving a request to change the print job, the external CPS 405 of the present embodiment determines whether to change the print job information in response to the change request and changes the print job information on the stored print job only in a case of determining to reflect in the print job information.

Figure 12:
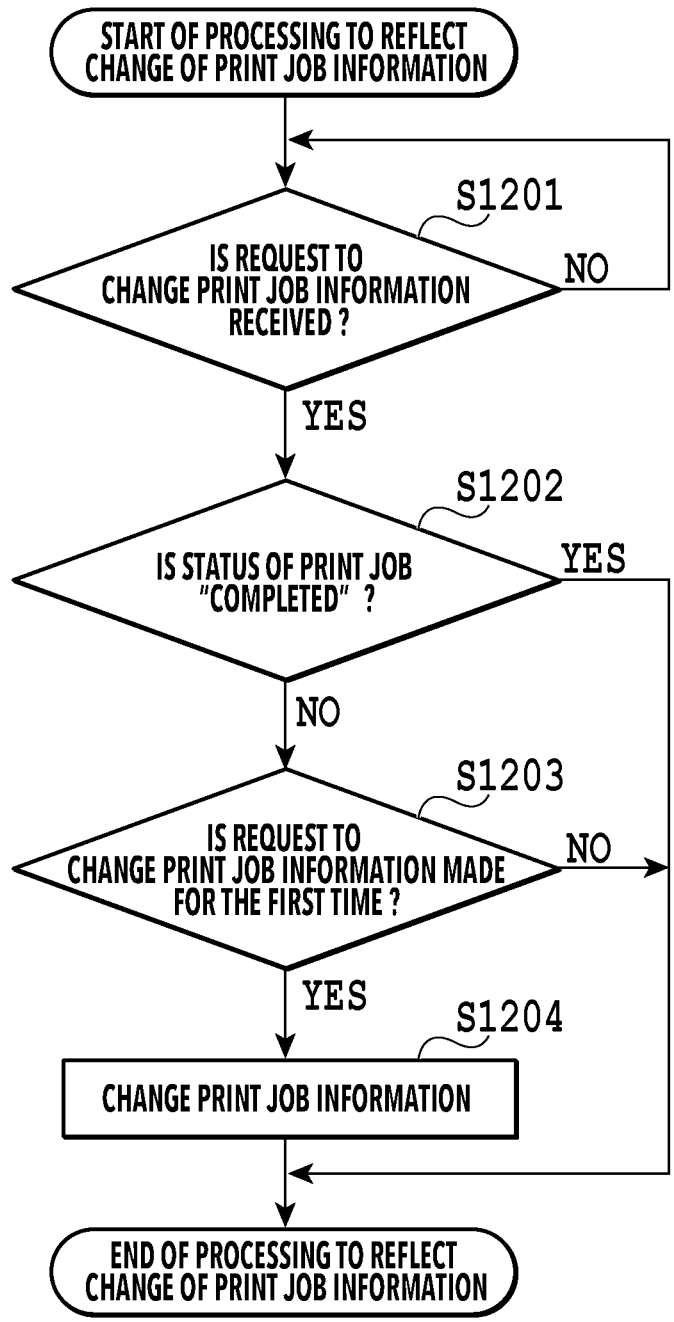
FIG. 12 is a flowchart for explaining processing in a cloud print service.

FIG. 12 is a flowchart for explaining details of the processing that is performed in a case where the external CPS 405 receives a request to change print job information. Explanation is given on the assumption that the processing shown in the flowchart in FIG. 12 is performed by the CPU (not shown schematically) of the CPS 405 loading the program code stored in the ROM (not shown schematically) onto the RAM and executing the program code. Further, part or all of the functions at the steps in FIG. 12 may be performed by hardware, such as an ASIC and an electronic circuit.

At S1201, the CPU of the external CPS 405 determines whether a request to change print job information is received. In a case where a request to change print job information is received (YES at S1201), at S1202, the CPU of the external CPS 405 determines whether the status of the print job requested to change is "Completed". The status of the print job is changed to "Completed" in a case where a notification of completion of the print job is received. Because of this, the processing at this step is performed in order not to receive a change request after the notification of completion of the print job.

In a case where the print job status is not "Completed" (NO at S1202), at S1203, the CPU of the external CPS 405 determines whether the request to change print job information for the print job for which the change request has been received is for the first time. In a case where the change request is for the first time (YES at S1203), at S1204, the CPU of the external CPS 405 performs the processing at S1119 in FIG. 11. That is, the CPU of the external CPS 405 changes the print job information on the print job for which the change request has been received in accordance with the change contents included in the received change request.

On the other hand, in a case where the print job status is "Completed" (YES at S1202) or in a case where the received change request is for the second or later time (NO at S1203), the processing at S1204 is skipped. That is, the CPU of the external CPS 405 does not change the print job information on the print job for which the change request has been received.

The processing at S1120 to S1121 is the same as the processing at S920 to S921, and therefore, explanation is omitted.

As explained above, according to the present embodiment, it is possible not to receive an inappropriate change of print job information by imposing restrictions on the change of print job information.

An aspect may also be accepted in which the processing in the flowchart in FIG. 12 is performed in the processing to change print job information by the CPS 404. For example, as explained in the first embodiment, the processing in FIG. 10A is performed before the processing at S111, but the processing in FIG. 12 may be performed by the CPU of the CPS 404 in place of the processing in FIG. 10A.

Third Embodiment

In the printing system in FIG. 4, the external CPS to which a print job is input from the client terminal transmits the print job to the CPS 404 and the CPS 404 causes the image forming apparatus to preform the print processing of the print job. In this case, it is not possible for the external CPS to check by which image forming apparatus the print processing has been performed for the print job. Because of this, there is a case where the print results totalized for each image forming apparatus are not totalized appropriately in a report that is provided by the external CPS.

FIG. 13 is a comparison example of a report in which print processing results are totalized for each image forming apparatus, which is generated by the external CPS 405. "Printer name" described in the report in FIG. 13 is the name for identifying the image forming apparatus registered in the CPS 405 and in FIG. 13, the number of pages output from each image forming apparatus indicated by the printer name is totalized. However, in the external CPS 405, the CPS 404 is registered as a virtual printer, and therefore, the CPS 404 is not an actual image forming apparatus. Because of this, it is not possible for the external CPS 405 to check by which image forming apparatus the print processing has been performed for the print job via the CPS 404. For example, even in a case where the print job is input to the image forming apparatus of "Printer A" from the CPS 404 and print processing is performed. the number of pages is totalized and a report is generated by regarding that the print processing has been performed by the CPS 404 as in FIG. 13.

Consequently, in the present embodiment, a method is explained in which print results are reflected appropriately for each image forming apparatus in a report that is generated in the external CPS that transmits the print job via another CPS in order to perform print processing for the print job that is input from the client terminal. In the present embodiment, differences from the first embodiment are explained mainly. The portions not described explicitly in particular are the same configuration and processing as those of the first embodiment.

Figure 14:
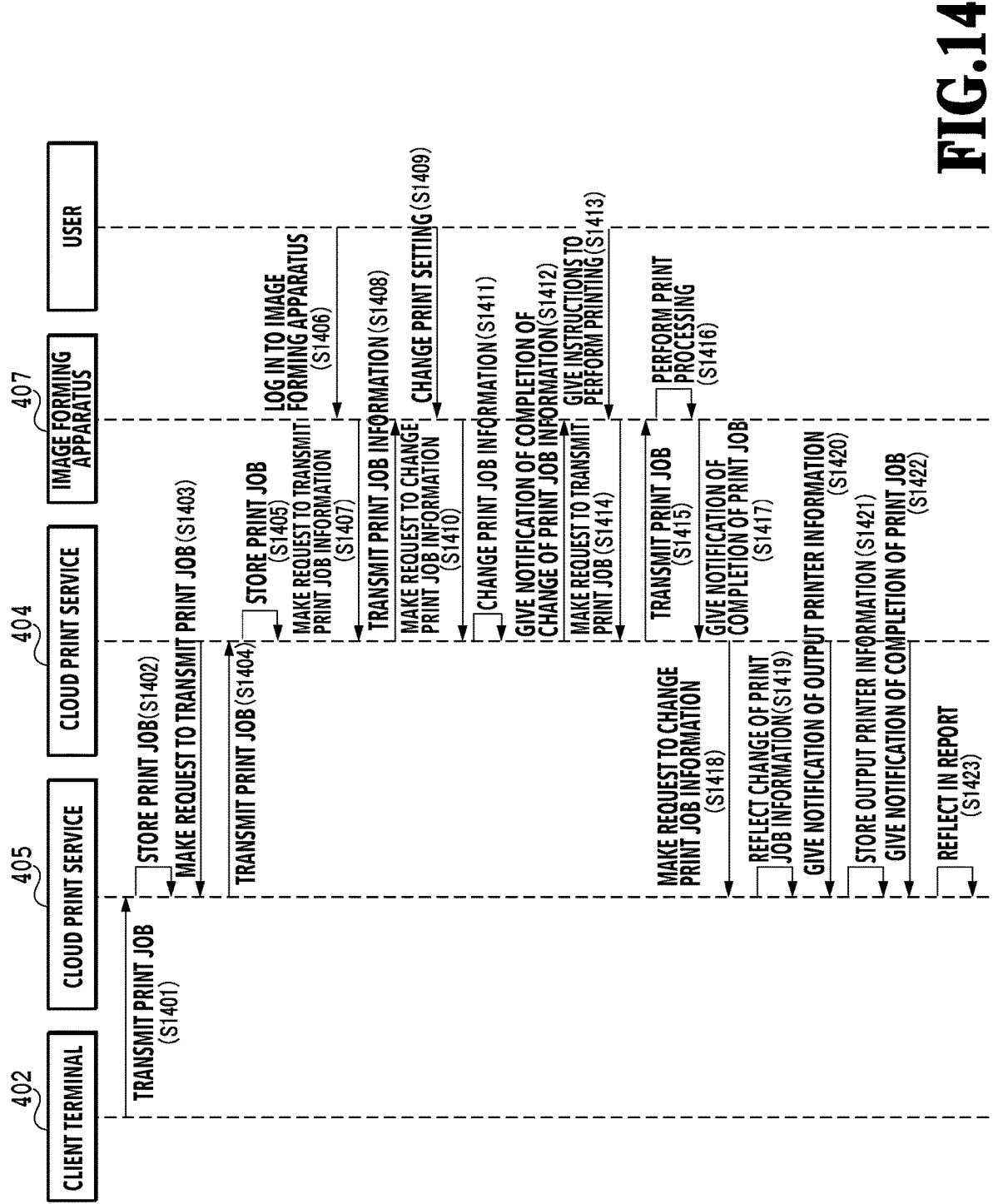
FIG. 14 is a diagram for explaining print processing using a plurality of cloud print services.

FIG. 14 is a sequence diagram showing the print processing of the present embodiment in the printing system in FIG. 4. By using FIG. 14, the print processing of the present embodiment is explained. Explanation is given on the assumption that in the print processing of the present embodiment, a request to change print job information is made after the notification of completion of the print job as in the second embodiment.

S1401 to S1419 are the same as S1101 to S1119, and therefore, explanation is omitted. After making a request to change the print job information on the print job at S1418, the CPS 404 of the present embodiment notifies the external CPS 405 of output printer information at S1420. Then, after notifying the external CPS 405 of output printer information, the CPS 404 notifies the external CPS 405 of the completion the print job.

FIG. 15 is a diagram showing the contents of "output printer information" to be transmitted to the external CPS 405 from the CPS 404 at S1420. In the output printer information, a job ID 1501, which is a unique identifier, for identifying the print job in the external CPS 405 is included. Further, a device serial No 1502, which is a unique identifier, for identifying the casing of the image forming apparatus having performed the print processing of the print job, an IP address 1503 of the image forming apparatus, and the like are included.

At S1421, the external CPS 405 receives the output printer information from the CPS 404 and stores the output printer information as information that is reflected in a report.

At S1422, the CPS 404 gives a notification of completion of the print job. At S1423, the external CPS 405 having received the notification of completion of the print job reflects the print results in a report based on the stored output printer information. Specifically, the external CPS 405 performs processing to specify from which image forming apparatus the print job that is input this time is output from "output printer information" and "printer information list" stored in the CPS 405. Then, the external CPS 405 performs processing for reflecting the print results of the print job in a report by regarding that the print processing is completed by the image forming apparatus specified based on the print job information.

FIG. 16 is a diagram showing "printer information list" stored in the external CPS 405. In the printer information list, information on the device registered in the external CPS 405 is stored. For example, in the printer information list, for each registered image forming apparatus, device ID, which is a unique identifier, for identifying the image forming apparatus, printer name, device serial No., IP address and the like are stored. That is, in the printer information list in FIG. 16, at least information on the image forming apparatus whose printer name is "Printer A" and the image forming apparatus whose printer name is "Printer B" is stored. An area 1601 in FIG. 16 is an area storing information on the image forming apparatus whose printer name is "Printer A" and an area 1602 is an area storing information on the image forming apparatus whose printer name is "Printer B".

The external CPS 405 searches the printer information list for the device serial No. or the IP address of the image forming apparatus, which matches with the device serial No. or the IP address of the image forming apparatus, which are stored in the output printer information. Then, the external CPS 405 specifies the device stored in the printer information list, whose device serial No. or the IP address matches with the device serial number or the IP address, which is stored in the output printer information, as the image forming apparatus having performed the print processing for the print job that is input this time. For example, in the output printer information in FIG. 15, the device serial No. 1502 of the image forming apparatus having performed the print processing for the print job whose job ID 1501 is "1" is "dev0000001". This matches with the device serial No. of "Printer A" of the devices stored in the printer information list in FIG. 16. Because of this, it is possible for the external CPS 405 to specify that the print job whose job ID 1501 is "1" has been subjected to the print processing by the image forming apparatus of "Printer A". In this case, at S1423, the external CPS 405 performs processing to reflect in a report by regarding that the print job input from the client device has been subjected to the print processing by the image forming apparatus of "Printer A".

As explained above, according to the present embodiment, even in a case where printing is performed via another CPS from the CPS to which the print job is input, it is possible for the CPS to which the print jot is input to reflect print results in a report by totalizing the print results for each image forming apparatus.

In the above-described explanation, explanation is given on the assumption that the image forming apparatus having performed the print processing is determined based on the device serial No. or the IP address, which is stored in the output printer information transmitted from the CPS 404. In addition, it may also be possible for the CPS 404 to give a notification also of the printer name of the image forming apparatus having performed the print processing along with the output printer information. In a case where it is not possible to find the image forming apparatus from the printer information list even by making a search with the device serial No. or the IP address, which is included in the output printer information, it may also be possible for the external CPS 405 to perform processing to reflect print results in a report by using the printer name received from the CPS 404.

Other Embodiments

In the above-described embodiment, explanation is given on the assumption that the external CPS to which a print job is input from the client device receives a request to change print job information from the CPS 404. In addition, an aspect may be accepted in which it is possible for the external CPS to receive a request to change print job information directly from the image forming apparatus having performed the print processing for the print job.

For example, the CPS 404 performs processing to transmit "output printer information" in place of processing to transmit a request to change print job information to the external CPS 405. Next, the external CPS 405 specifies the image forming apparatus having performed the print processing based on the output printer information and requests the image forming apparatus for the output results of the print job. The image forming apparatus notifies the external CPS 405 of the results of the print processing of the job print. By the method as described above, it may also be possible to enable the external CPS 405 to appropriately receive the print setting at the time of the print processing being performed finally.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-148370 filed Sep. 3, 2020, which is hereby incorporated by reference wherein in its entirety.

What is claimed is:

1. A server apparatus providing a cloud print service that receives a print job and causes an image forming apparatus to perform print processing for the received print job, the server apparatus comprising:
   a first reception unit configured to receive a print job from a client terminal or another server apparatus that provides another cloud print service;
   a second reception unit configured to receive instructions to change setting of the print job received by the first reception unit, the instructions being given via the image forming apparatus; and
   a notification unit configured to notify the other server apparatus of contents of the instructions in a case where the instructions received by the second reception unit are instructions for the print job received by the first reception unit from the other server apparatus.

2. The server apparatus according to claim 1, wherein the notification unit does not give the notification in a case where the instructions received by the second reception unit are instructions for the print job received by the first reception unit from the client terminal.

3. The server apparatus according to claim 1, wherein the notification unit gives the notification after the image forming apparatus performs print processing for the print job received by the first reception unit.

4. The server apparatus according to claim 1, further comprising:
a storage unit configured to store the print job received by the first reception unit;
a change unit configured to change setting of the stored print job in response to the instructions; and
a transmission unit configured to transmit the received print job to the image forming apparatus, wherein
the transmission unit transmits the print job whose setting has been changed by the change unit in a case where the second reception unit receives the instructions.

5. The server apparatus according to claim 4, wherein the change unit does not change setting of the stored print job for the instructions received by the second reception unit exceeding a predetermined number of times.

6. The server apparatus according to claim 5, wherein the predetermine number of times is one.

7. The server apparatus according to claim 1, further comprising:
a second notification unit configured to notify the other server apparatus of information for identifying an image forming apparatus having performed print processing for the print job received by the first reception unit in a case where the print job received by the first reception unit is a print job transmitted from the other server apparatus.

8. A server apparatus that provides a cloud print service, the server apparatus comprising:
a first reception unit configured to receive a print job from a client terminal;
a transmission unit configured to transmit the print job received by the first reception unit to another server apparatus that provides another cloud print service, the other server apparatus transmitting print job to an image forming apparatus and causing the image forming apparatus to perform print processing;
a second reception unit configured to receive contents of instructions to change setting of the print job received by the first reception unit, the instructions being given via the image forming apparatus; and
a generation unit configured to generate a report relating to the print job received by the first reception unit by reflecting the contents of the instructions.

9. The server apparatus according to claim 8, further comprising:
a third reception unit configured to receive information for identifying an image forming apparatus having performed print processing for the print job received by the first reception unit from the other server apparatus.

10. The server apparatus according to claim 9, wherein the second reception unit receives contents of the instructions from an image forming apparatus specified based on information received by the third reception unit.

11. The server apparatus according to claim 8, wherein the second reception unit receives contents of the instructions from the other server apparatus.

12. The server apparatus according to claim 8, further comprising:
a storage unit configured to store the print job received by the first reception unit; and
a change unit configured to change setting of the stored print job based on contents of the instructions received by the second reception unit, wherein
the generation unit generates the report based on the print job whose setting has been changed by the change unit.

13. The server apparatus according to claim 12, wherein the change unit does not change setting of the stored print job for the instructions received by the second reception unit exceeding a predetermined number of times.

14. The server apparatus according to claim 13, wherein the predetermined number of times is one.

15. A control method of a cloud print service that receives a print job and causes an image forming apparatus to perform print processing for the received print job, the control method comprising:
receiving a print job from a client terminal or another server apparatus that provides another cloud print service;
receiving instructions to change setting of the received print job, the instructions being given via the image forming apparatus; and
notifying the other server apparatus of contents of the instructions in a case where the received instructions are instructions for the print job received from the other server apparatus.

16. A control method of a cloud print service, the control method comprising:
receiving a print job from a client terminal;
transmitting the received print job to another server apparatus that provides another cloud print service, the other server apparatus transmitting a print job to an image forming apparatus and causing the image forming apparatus to perform print processing;
receiving contents of instructions to change setting of the received print job, the instructions being given via the image forming apparatus; and
generating a report relating to the received print job by reflecting the contents of the instructions.

17. A non-transitory computer readable storage medium storing a program which causes a computer to perform a control method of a cloud print service that receives a print job and causes an image forming apparatus to perform print processing for the received print job, the control method comprising:
receiving a print job from a client terminal or another server apparatus that provides another cloud print service;
receiving instructions to change setting of the received print job, the instructions being given via the image forming apparatus; and
notifying the other server apparatus of contents of the instructions in a case where the received instructions are instructions for the print job received from the other server apparatus.

18. A non-transitory computer readable storage medium storing a program which causes a computer to perform a control method of a cloud print service, the control method comprising:
receiving a print job from a client terminal;
transmitting the received print job to another server apparatus that provides another cloud print service, the other server apparatus transmitting a print job to an image forming apparatus and causing the image forming apparatus to perform print processing;
receiving contents of instructions to change setting of the received print job, the instructions being given via the image forming apparatus; and generating a report relating to the received print job by reflecting the contents of the instructions.

* * * * *